United States Patent [19]

Payne

[11] 4,310,990
[45] Jan. 19, 1982

[54] HYDROPONICS

[76] Inventor: Robert L. Payne, 1315 N. Cherokee Ave., Los Angeles, Calif. 90028

[21] Appl. No.: 147,176

[22] Filed: May 6, 1980

[51] Int. Cl.³ .............................................. A01G 31/02
[52] U.S. Cl. ............................................ 47/59; 47/62
[58] Field of Search ...................................... 47/59–65, 47/79

[56] References Cited

U.S. PATENT DOCUMENTS

| | | | |
|---|---|---|---|
| 4,106,235 | 8/1978 | Smith | 47/59 |
| 4,211,034 | 7/1980 | Piesner | 47/59 X |
| 4,255,896 | 3/1981 | Carl | 47/79 X |

Primary Examiner—James R. Feyrer

[57] ABSTRACT

A structure made from tubular elements which interfit to form a plural compartment hydroponic unit. The upper compartment is filled with inert root medium, houses a fluid dispensing unit, and contains slits which communicate with the lower compartment which constitutes a resevoir. The tubular housings are substantially sealingly interconnected. The lower compartment contains a nutrient inlet provision which communicates via a manifold housed in the lower compartment with the interior of the upper compartment. The lower compartment also contains a drain provision.

3 Claims, 1 Drawing Figure

U.S. Patent  Jan. 19, 1982  4,310,990
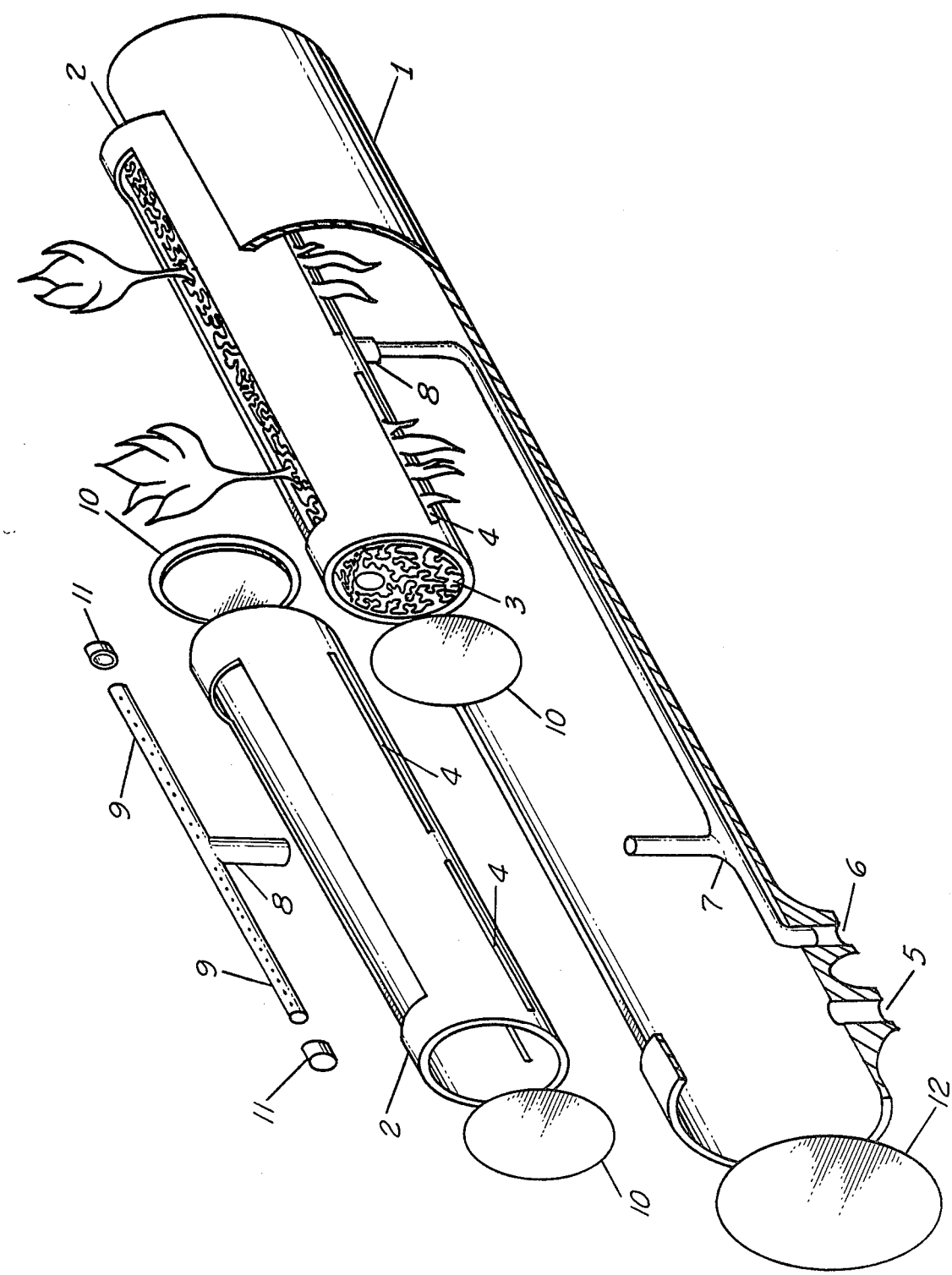

HYDROPONICS

BACKGROUND OF THE INVENTION

This invention pertains to the growth and maintenance of plants in hydroponic devices.

The hydroponic cultivation of crops has received only limited acceptance as an alternative to conventional farming. Commercial growers consider a hydroponic installation feasible only for high profit crops which will immediately return the high initial investment in the greenhouse and growing system. And in the consumer market, despite the resurging popularity of home gardening in response to the upward spiral in food prices, again, the relative high cost of the devices offered by manufacturers against the low value of the vegetables and flowers produced has limited the acceptance of hydroponics. These high costs are not inherent to hydroponics, which is the simple feeding of a nutrient solution to the roots of plants grown independently of the soil; rather, the costs are due to the devices now employed by commercial and amateur systems: the expense of the chemically inert medium and the equipment required to contain and support that medium far exceed the cost of the nutrient delievery systems. It is evident, to reduce the costs of hydroponics and thus promote the acceptance of hydroponics in the marketplace, the medium and the devices secondary to the actual nourishment of the growing plants must be eliminated.

It is known that the hydroponic cultivation of plants, in carefully controlled circumstances, requires no medium. In laboratory experiments, when researchers attempt to determine the precise affects of certain chemicals on plants, plants are grown suspended in a vessel, nutrient solution periodicly or incessantly trickling over the bare, but protected, roots. Or the roots float in a vessel filled with nutrient solution, the solution constantly aerated to supply needed oxygen. In these ways, there can be no unknown substances introduced by contaminated medium. However, the fact that a system failure of more than a few hours results in a total crop loss limits the commercial acceptance of the techniques.

A variation of the above-described laboratory process in which the roots are suspended in a protective vessel is the continuous flow technique. In this process, the plant roots lie in channels, the system's nutrient solution continuously flowing over the bare roots. The channels are mounted horizontally on racks, one above another like rungs in a ladder. Pumped solution enters the top channel, flows through each channel, finally draining into a reservoir. Some systems, in an improvement over simply spreading the naked roots over the epoxy-coated aluminum or plastic channels, incorporate fiberous matting at the bottom of the channels. This matting offers a greater area of moisture and nutrients to the roots. But this technique is also subject, though to a lesser degree, to total loss in the event of even a temporary failure in the circulation of the solution. The open channels also present problems: sunlight striking the exposed nutrient solution creates ideal conditions for the growth of airborne micro-organisms; and if the grower attempts to use the system outside of a greenhouse, insects attack the naked roots. It is only with elaborate fabrications that prior inventions have overcome the shortcomings of the technique*.

*U.S. Pat. Nos. 3,667,157 Longhini, 4,035,950 Anseim, 4,166,341 Vestergaard.

SUMMARY OF THE INVENTION

The device presented here not only offers the commercial grower cost-efficient hydroponics, but also offers the grower the opportunity to incorporate assembly-line procedures in the germination, growth, and harvesting of crops. And to the amateur gardener, the device makes inexpensive hydroponics possible in homes and apartments.

The device consists of interlocking horizontal tubes, one above the other, and piping in the interior of the tubes. The lower tube, hereafter called the channel, contains and protects the plant roots, also capturing excess nutrient solution draining from the roots. The upper tube, hereafter called the cartridge, which contains a small amount of inert medium, provides a place for the germination of seeds and the rooting of transplanted cuttings; the cartridge, when slipped into place over the channel, also serves to seal the channel. The interior piping carries nutrient solution to the cartridge, perforated piping within the cartridge then distributing the solution to the roots of the plants.

BRIEF DESCRIPTION OF THE DRAWING

The single FIGURE of the drawing shows a perspective, partially cut away and partially exploded view of the invention.

The device integrates aspects of the various hydroponic techniques mentioned above. Referring to the illustration, the channel 1, which is cut from a tube of plastic, performs much the same function as the plastic or aluminum channels common to the continuous flow technique. However, when sealed by the cartridge 2, the channel becomes a closed chamber, retaining moisture around the roots, and protecting the roots from insects and airborne micro-organisms.

The cartridge, which is also cut from a tube of plastic, contains inert medium 3. However, unlike the hydroponic systems employing inert medium for the support and protection of the roots of the plants in the system, the cartridge contains only so much medium necessary for the sprouting of seeds and the anchoring of immature plants: root growth does not occur only within the medium; rather the roots soon fill the few cubic inches of medium within the cartridge, then grow downward, through slits 4 in the bottom of the cartridge and into the sealed moist chamber of the channel.

The flow of solution into and from the device is accomplished by two sockets, one for the output 5 of the draining solution, the other for the input 6 of the solution. To connect the device to a reservoir, pipes or hoses plug into the exterior apertures of these sockets. All other piping for the device is contained within the channel and the cartridge.

It is the interior piping which is unique to this device. A small diameter plastic pipe 7 plugs into the interior aperture of the input socket. This pipe carries nutrient solution to the cartridge. At the point where the pipe carrying the solution joins the cartridge, there is a slip socket 8. The nutrient solution flows through the slip socket to perforated piping within the cartridge. The slip socket allows the cartridge to be unplugged. The cartridge—including the medium, the growing plants, and the perforated piping within the medium—can be removed from the channel without disassembly of the device.

In the event root growth clogs the perforated piping, access for servicing the perforated piping is accomplished by removing the end pieces 10 of the cartridge, then the caps 11 on the ends of the piping. With prior hydroponic systems employing inert medium, the unavoidable interruption of the operation and the disassembly of distribution piping to clean the piping destroys any plants hindering access. With this device, the cartridge containing the clogged piping may be removed while the device continues in operation, the piping cleaned, and the living plants returned to the device. Removal of the end pieces also facilitates the cleaning of the cartridges after the harvest of a crop. The end pieces 12 of the channel may also be removed to facilitate the cleaning of the channel. The end pieces of the cartridges and the channel, and the caps of the perforated piping are friction fitted. Glue is unnecessary.

In operation, a reservoir and pump may serve a single device, that is, one channel with one or more cartridges; or the reservoir and pump may provide nutrient solution to several devices. Mounted horizontally on a vertical or slanting rack, one device about another, several interconnected devices operate in a series: the pump provides solution to the top device, the solution draining from the top device, flowing through each device, finally returning to the reservoir to be recirculated.

For the commercial hydroponic grower, the size and number of the devices employed may be expanded to serve any installation. The channel of a single device may be as long as twenty feet (which is the maximum length of the inexpensive tubing from which the channel is cut); each channel may receive several cartridges; and, to expand the scale of the rack mounting method described above, several racks of devices may be served by a single reservoir which contains a pump for each rack: in this manner, an installation may operate from a single reservoir, which avoids the duplication of expensive automatic timers and controls.

But it is the technique of separating the cartridge from the channel which offers the hydroponic grower employing these devices a unique operation:

- the plants may be removed from the channel, without interruption of the system, for the inspection or pruning of the plants at a convenient work area;
- individual devices may be serviced or cleaned while the system continues in operation;
- cartridges may be housed in a warm, moist section of the greenhouse until seeds sprout, then the cartridges bearing the seedlings plugged into the system where there is full sunlight;
- maturing plants may be moved from an environment which promotes fast growth, to an environment which promotes prompt and continuing production of fruit;
- diseased plants may be removed to an alternate system which circulates chemicals vital to the recovery of those plants, and a cartridge containing healthy plants plugged into the vacant space;
- plants that are ready for harvest or that are beyond fruiting may be removed in mass, the cartridges loaded on carts and moved to a work area;
- and in the case of a new hydroponic installation, cartridges bearing seedlings and mature plants could be transferred from another greenhouse, the cartridges plugged into the new system, and vegetables or flowers harvested the first day of operation, so as to accellerated the grower's return on investment.

For the amateur grower, this device is the first hydroponic design which is not simply conventional equipment reduced in size. Manufacturers who now market devices offer the standard container, gravel, and reservoir systems, which, though smaller in size and less in cost than commercial units, present the same difficult operation and slow return on investment inherent in the commercial systems. These home garden systems can only be used by those gardeners who have a backyard they can devote to hydroponics. In this increasingly urban society, many would-be gardeners do not have backyards, and for those who do, the sacrifice of perhaps their only private open air space for the production of food or flowers becomes a prohibitive expense.

Though the home gardener may never have need for the twenty foot devices available to the commercial grower, the device presented here, whether manufactured in twenty foot or four foot lengths, offers the amateur the same options available to the professional grower; these options are not negated by the gardener lacking a greenhouse or yard:

- a number of devices may be mounted on any vertical surface, whether it is a fence, balcony railing, or window frame;
- a single reservoir may serve devices located both within and outside an apartment or house, though the seperate devices may each need a pump to adequately distribute nutrient solution;
- vegetables and spices may be grown to maturity in full sunlight, transferred to a kitchen unit, and the living, still-growing vegetables and spices harvested as needed;
- flowers may be grown to blossoming outdoors, the cartridge then transferred indoors to a suitable container (any nutrient distribution other than hand-sprinkling is unnecessary for short periods of time), and when the plant weakens from lack of sunlight, return outdoors;
- in the event of an impending freeze, hot-spell, wind storm, or other unavoidable threat to the plants growing outside, the plants may be removed to shelter, protected with a moist cover, then replaced in their channels when the hazard passes;
- and the gardener who is satisfied with the performance of a basic unit may purchase and incorporate additional units into the hydroponic garden without duplicating the previous expenses of reservoirs, timers, or or components.

This device also offers the opportunity to garden to those individuals who, due to age or trauma, lack the physical ability to tend a soil or prior hydroponic garden;

- for the aged, who are the very individuals most likely to need the low-cost food produced by this device, a system may be installed which eliminates bending or kneeling, shoveling, or the lifting of heavy materials;
- for those individuals who suffer progressive nerve disorders, the negligible weight of the cartridges makes gardening possible despite the loss of dexterity or digital sensation;
- and for those individuals who have survived spinal injury or multiple loss of limbs, a system of these devices may be conveniently tended from a wheelchair.

I claim:

1. A device for the hydroponic cultivation of plants, consisting of:

two horizontal tubes, of opaque, water-proof, and rigid plastic, sealed at their ends, of substantially equal length, the axes of the tubes parallel on the same vertical plane, that is, one tube above the other, the lower tube slotted to receive less than one-half the circumference of the upper, the length of the upper tube thus resting within and above the length of the lower;

said upper tube slotted lengthwise to receive seeds, transplanted cuttings, and inert medium for the anchoring and protection of the plant roots;

said upper tube containing perforated piping which parallel to the axis of the tube and covered by the inert medium, extends throughout the length of the upper tube so as to distribute nutrient solution evenly to the roots of the several plants which may be contained in the inert medium;

said upper tube, the ends of the tube removable to allow cleaning;

said upper tube containing perforated piping, the ends of the perforated piping removable to allow cleaning;

said upper tube being slit repeatedly, the slits being parallel to the tube's axis and extending throughout its length in the fraction of its circumference which rests within the lower tube, said slits allowing the nutrient solution distributed by the piping to the roots of the plants to drain from the upper tube, the slits also allowing the roots of the plants to grow downward so as to follow the solution draining from the upper tube;

a lower tube slotted to receive the upper tube, the length of the upper tube fitting into the slot so as to create a seal excluding daylight, insects, and ambient air, the slits of the upper tube thus sealed within the lower tube;

whereby a substantial seal is created to protect roots depending from said upper tube and a closed channel is defined to contain liquid draining from the upper tube;

said lower tube having ends which are removable to allow cleaning;

said lower tube fitting with sockets for drainage and the input of nutrient solution;

said lower tube containing a pipe connecting the interior aperture of the solution input socket to the perforated pipe of the upper tube, so that nutrient solution enters the lower tube through the input socket, flows through the pipe contained within the sealed channel of the lower tube to the perforated pipe of the upper tube, the perforated pipe distributing the nutrient solution to the roots of the plants which may be supported in the upper tube, the nutrient solution flowing over the roots hanging from the upper tube, the lower tube capturing the unabsorbed solution, then channeling the solution to the drain.

2. The device of claim 1, wherein the connection between the pipe in the lower tube and the perforated pipe in the upper tube comprises a slip socket, the slip socket allowing the upper tube to be disconnected from the pipe assembly of the lower tube, and the upper tube removed from the lower tube without the interruption of the operation of the hydroponic device.

3. The device of claim 1, wherein the lower tube is of a predetermined length, and said upper tube is comprised of at least one tubular section, the connections between the pipe in the lower tube and the perforated pipe in each upper tube accomplished by multiple slip sockets along the length of the pipe within the lower tube, each slip socket allowing an upper tube to be disconnected from the pipe assembly of the lower tube, the upper tube removed and the substitution in the space opened of an upper tube of equal or less length, without the interruption of the operation of the device.

* * * * *